W. A. VAN BRUNT & S. E. DAVIS.
Cultivator-Tooth.
No. 201,304.      Patented March 12, 1878.
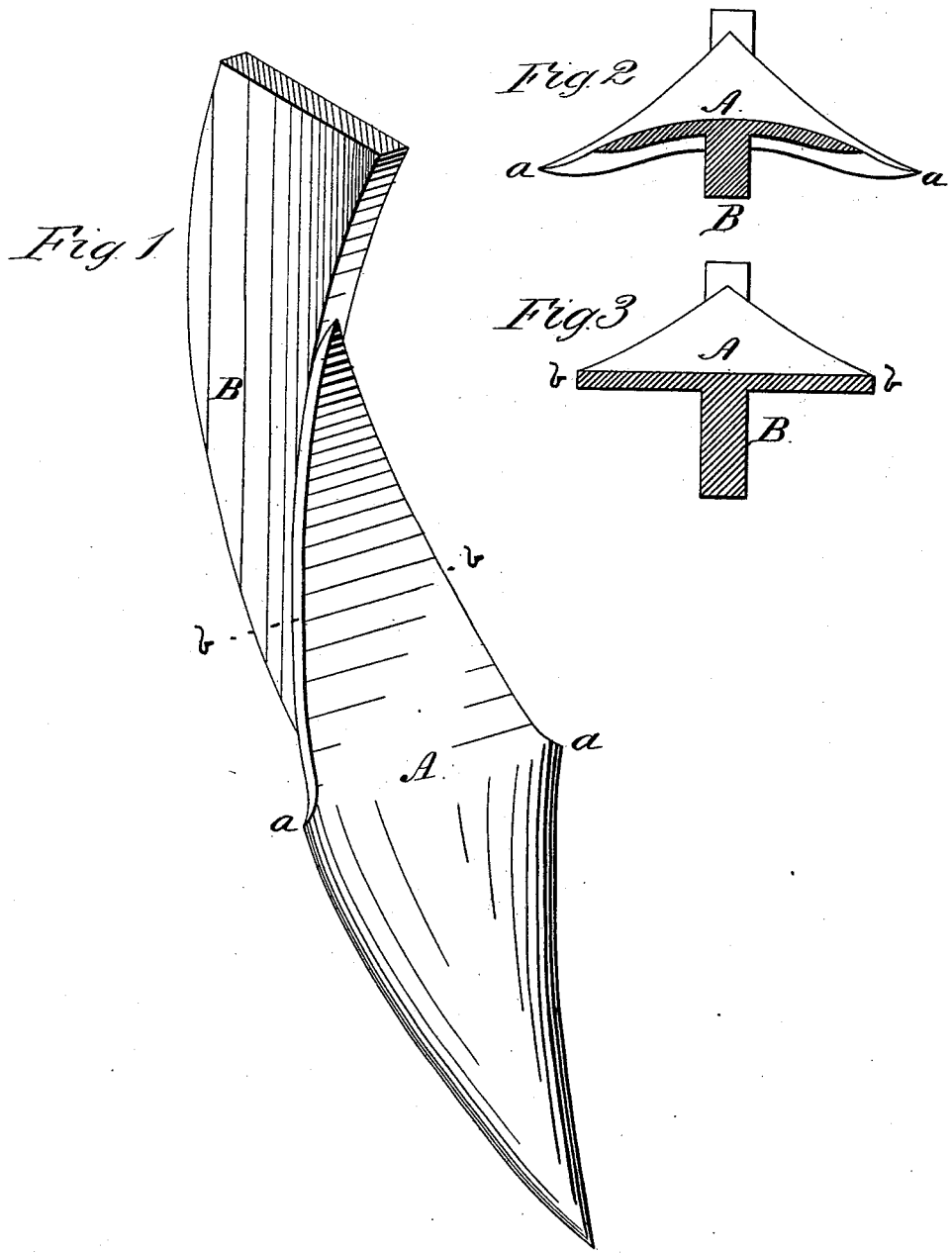

UNITED STATES PATENT OFFICE.

WILLARD A. VAN BRUNT AND SPENCER E. DAVIS, OF HORICON, WIS.

IMPROVEMENT IN CULTIVATOR-TEETH.

Specification forming part of Letters Patent No. 201,304, dated March 12, 1878; application filed April 4, 1877.

*To all whom it may concern:*

Be it known that we, WILLARD A. VAN BRUNT and SPENCER E. DAVIS, of Horicon, in the county of Dodge and State of Wisconsin, have invented a certain new and useful Improvement in Cultivator-Teeth; and we do hereby declare the following to be a full, clear, and exact description of the invention, such as will enable others skilled in the art to which it pertains to make and use it, reference being had to the accompanying drawings, which form part of this specification, in which—

Figure 1 is a perspective view of our improved cultivator-tooth. Fig. 2 is a transverse section through the lower part, and Fig. 3 is a transverse section through the upper part, of the tooth.

In the construction of cultivator-teeth to be used principally upon broadcast seeding-machines, which are adapted to scatter seed and at the same time cultivate or work the soil, it is necessary to provide for the "drawing" or sinking into the earth of the point of the tooth, and for the scouring of the tooth by the soil.

The object of the invention about to be described is to produce a tooth which will meet every essential requirement of such a device.

It is well known that the penetrating power of a cultivator-tooth is improved by turning or slightly curving downward or rearward its cutting-edges, or even by making the lower or penetrating portion of the tooth laterally convex, and that a flat, or nearly flat, surface is the best for scouring purposes.

With this knowledge, and with an extensive experience in investigating and testing the qualities of agricultural implements, we have conceived the present invention; which consists, essentially, of a cultivator-tooth having, first, its lower pointed or cutting section formed with sharp cleaving-edges, rearwardly-curved or not, as may be desirable, and with a laterally-curved facial surface terminating in such edges, whereby the requisite penetrating and cultivating qualities are imparted to the tooth; and, secondly, its upper section (the edges of which converge from the angles of meeting with the edges of the lower section) made flat, so as to present, at a suitable distance from the point, a true and effective scouring-surface.

In the accompanying drawings, A designates a cultivator-tooth constructed according to our improved plan. Said tooth is diamond-shaped in outline, and is made with a transversely-convex or rounded surface, extending from the angles $a\ a$ to its lower end or penetrating-point, and terminating in sharpened edges, so as to impart to it the proper penetrating and turning qualities. From the angles $a\ a$ to the upper end the intervening portion of the tooth-surface is made flat, or nearly so, laterally or between its edges. The tooth may be curved from point to point, as shown.

B designates the shank, to which the tooth is fastened in any desirable way.

Having described our invention, we claim—

A cultivator-tooth diamond-shaped in outline, the surface of its lower or penetrating portion made laterally convex or rounded, and formed with sharp cleaving-edges, and its upper or scouring surface made transversely flat, substantially as and for the purpose described.

In testimony that we claim the foregoing we have hereunto set our hands this 22d day of February, 1877.

WILLARD A. VAN BRUNT.
   SPENCER E. DAVIS.

Witnesses:
 J. B. HAYS,
 THOS. A. CONNOLLY.